United States Patent
Peng et al.

(10) Patent No.: US 7,729,204 B2
(45) Date of Patent: Jun. 1, 2010

(54) ACOUSTIC RANGING

(75) Inventors: Chunyi Peng, Beijing (CN); Guobin Shen, Beijing (CN); Kun Tan, Beijing (CN); Yongguang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/868,515

(22) Filed: Oct. 7, 2007

(65) Prior Publication Data

US 2008/0304361 A1 Dec. 11, 2008

Related U.S. Application Data

(60) Provisional application No. 60/942,739, filed on Jun. 8, 2007.

(51) Int. Cl.
*G01S 3/80* (2006.01)

(52) U.S. Cl. ..................................................... 367/127

(58) Field of Classification Search ............ 367/87–191
See application file for complete search history.

(56) References Cited

U.S. PATENT DOCUMENTS

| | | | |
|---|---|---|---|
| 5,287,627 A * | 2/1994 | Rando ........................ 33/227 |
| 5,812,865 A | 9/1998 | Theimer et al. |
| 6,353,398 B1 | 3/2002 | Amin et al. |
| 6,487,180 B1 | 11/2002 | Borgstahl et al. |
| 6,549,630 B1 | 4/2003 | Bobisuthi |
| 6,633,757 B1 | 10/2003 | Hermann et al. |
| 6,672,506 B2 | 1/2004 | Swartz et al. |
| 6,741,188 B1 | 5/2004 | Miller et al. |
| 6,748,324 B2 | 6/2004 | Patwari et al. |
| D494,584 S | 8/2004 | Schlieffers et al. |
| 6,796,505 B2 | 9/2004 | Pellaumail et al. |
| 6,837,436 B2 | 1/2005 | Swartz et al. |
| 6,928,264 B2 | 8/2005 | Botteck |

(Continued)

FOREIGN PATENT DOCUMENTS

EP          1788845 A2       5/2007

(Continued)

OTHER PUBLICATIONS

Dalton, et al., "Audio-Based Self-Localization for Ubiquitous Sensor Networks", at <<http://web.media.mit.edu/~vmb/papers/AES05.pdf>>, Audio Engineering Society, 2005, pp. 7.

(Continued)

*Primary Examiner*—Thomas H Tarcza
*Assistant Examiner*—Luke D Ratcliffe
(74) *Attorney, Agent, or Firm*—Lee & Hayes, PLLC

(57) ABSTRACT

Acoustic ranging may involve determining a distance between a first device and at least one other device using one or more acoustic signals. In an example embodiment, a first device emits a first acoustic signal and then receives the first acoustic signal at a first time. The first device also receives a second acoustic signal at a second time, with the second acoustic signal having been emitted by a second device. The first device ascertains a first value that reflects a difference between the first time and the second time. Responsive to at least the ascertained first value, the first device determines a distance between the first device and the second device.

20 Claims, 9 Drawing Sheets

U.S. PATENT DOCUMENTS

| | | | |
|---|---|---|---|
| 7,010,501 | B1 | 3/2006 | Roslak et al. |
| 7,040,541 | B2 | 5/2006 | Swartz et al. |
| 7,063,263 | B2 | 6/2006 | Swartz et al. |
| 7,065,575 | B1 | 6/2006 | Machiraju et al. |
| 7,130,895 | B2 | 10/2006 | Zintel et al. |
| 7,171,378 | B2 | 1/2007 | Petrovich et al. |
| 7,195,157 | B2 | 3/2007 | Swartz et al. |
| 7,385,501 | B2 | 6/2008 | Miller et al. |
| 7,525,450 | B2 | 4/2009 | Miller et al. |
| 2001/0030664 | A1 | 10/2001 | Shulman et al. |
| 2002/0086656 | A1 | 7/2002 | Mattisson |
| 2002/0176323 | A1* | 11/2002 | Magine et al. ............. 367/134 |
| 2004/0162871 | A1 | 8/2004 | Pabla et al. |
| 2004/0201500 | A1 | 10/2004 | Miller et al. |
| 2005/0249036 | A1* | 11/2005 | Davies et al. ................ 367/99 |
| 2005/0266858 | A1 | 12/2005 | Miller et al. |
| 2005/0273609 | A1* | 12/2005 | Eronen ...................... 713/171 |
| 2006/0019676 | A1 | 1/2006 | Miller et al. |
| 2006/0046709 | A1 | 3/2006 | Krumm et al. |
| 2006/0149495 | A1* | 7/2006 | Mazalek et al. ............ 702/150 |
| 2006/0262944 | A1 | 11/2006 | Rasmussen et al. |
| 2006/0281470 | A1 | 12/2006 | Shi et al. |
| 2008/0090591 | A1 | 4/2008 | Miller et al. |
| 2008/0091537 | A1 | 4/2008 | Miller et al. |
| 2008/0161018 | A1 | 7/2008 | Miller et al. |
| 2008/0232239 | A1* | 9/2008 | Mujtaba et al. ............. 370/209 |

FOREIGN PATENT DOCUMENTS

| | | |
|---|---|---|
| WO | WO0065530 A1 | 11/2000 |
| WO | WO2005079114 A1 | 8/2005 |
| WO | WO2005109781 A1 | 11/2005 |

OTHER PUBLICATIONS

Girod, L., The Design and Implementation of a Self-Calibrating Distributed Acoustic Sensing Platform.

Kusy, "Spatiotemporal Coordination in Wireless Sensor Networks", at <<http://www.isis.vanderbilt.edu/projects/nest/people/brano/pubs/BranoKusy_quals_submitted.pdf>>, Institute for Software Integrated Systems, 2006, pp. 37.

Priyantha, N., The Cricket Location-Support System.

Youssef, M., PinPoint: An Asynchronous Time-Based Location Determination System.

Amir, et al., "Buddy tracking-efficient proximity detection among mobile friends", Jul. 5, 2006, at <<http://www.cs.arizona.edu/~alon/papers/cell.pdf>>, pp. 1-36.

Barton, et al., "The MeetingMachine: Interactive Workspace Support for Nomadic Users", available at least as early as Jan. 23, 2007, at <<http://iwork.stanford.edu/pubs/MM-WMCSA2003.pdf>>, IEEE, 2003, pp. 1-11.

Treu, et al., "Efficient Proximity Detection among Mobile Targets with Dead Reckoning", available at least as early as Jan. 23, 2007, at <<http://delivery.acm.org/10.1145/1170000/1164797/p75-treu.pdf?key1=1164797&key2=2970559611&coll=ACM&dl=ACM&CFID=15151515&CFTOKEN=6184618>>, ACM, 2006, pp. 75-83.

* cited by examiner

Example Acoustic Ranging Method

Example Software Architecture for Acoustic Ranging

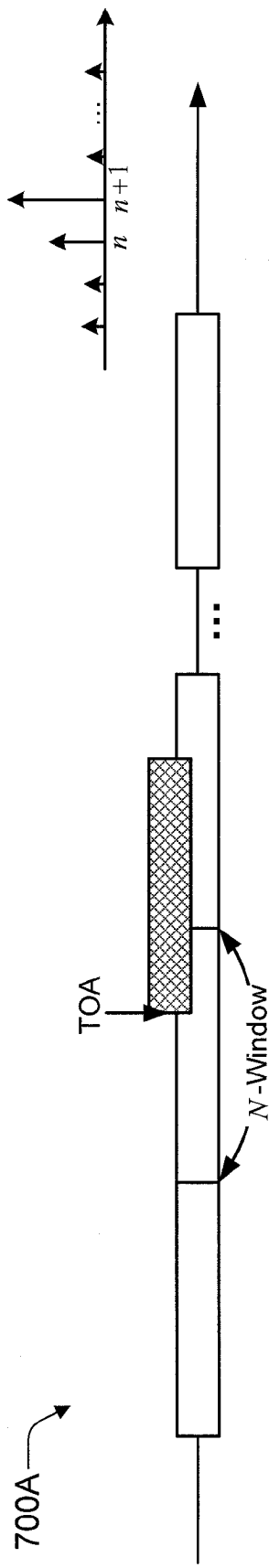
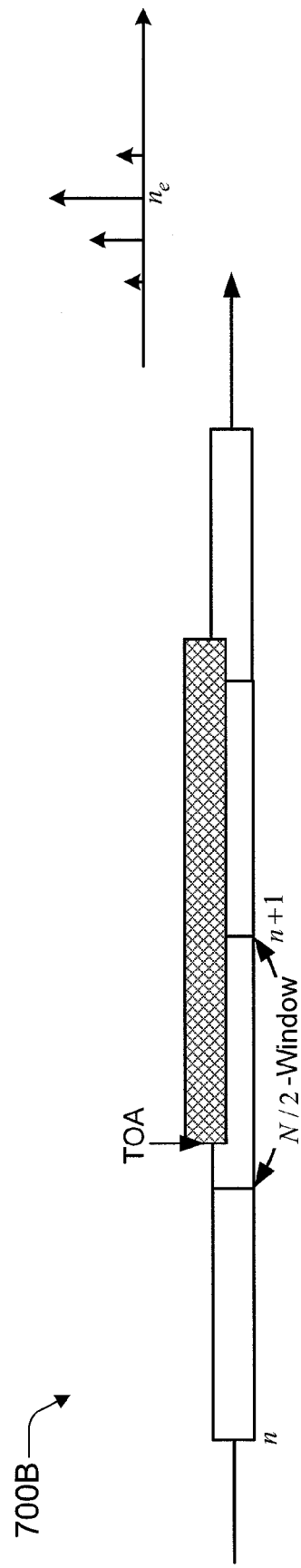

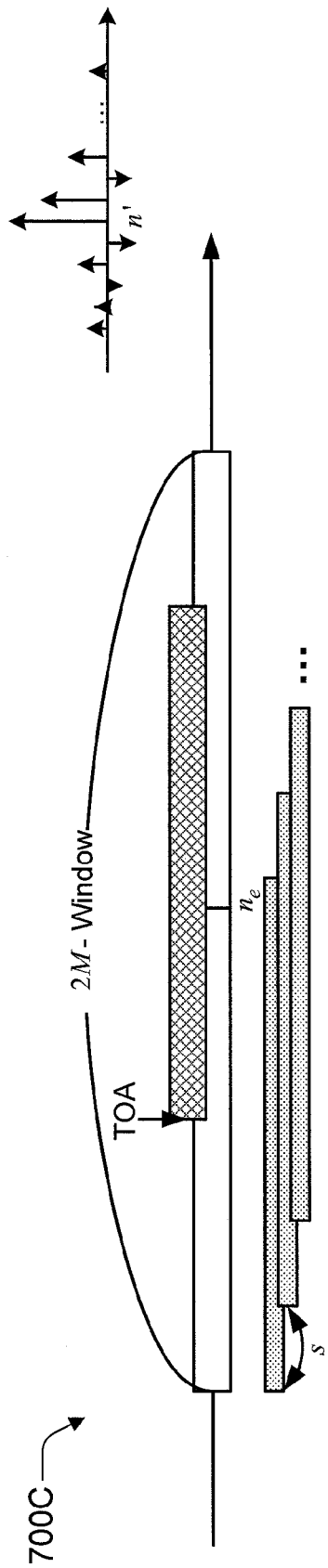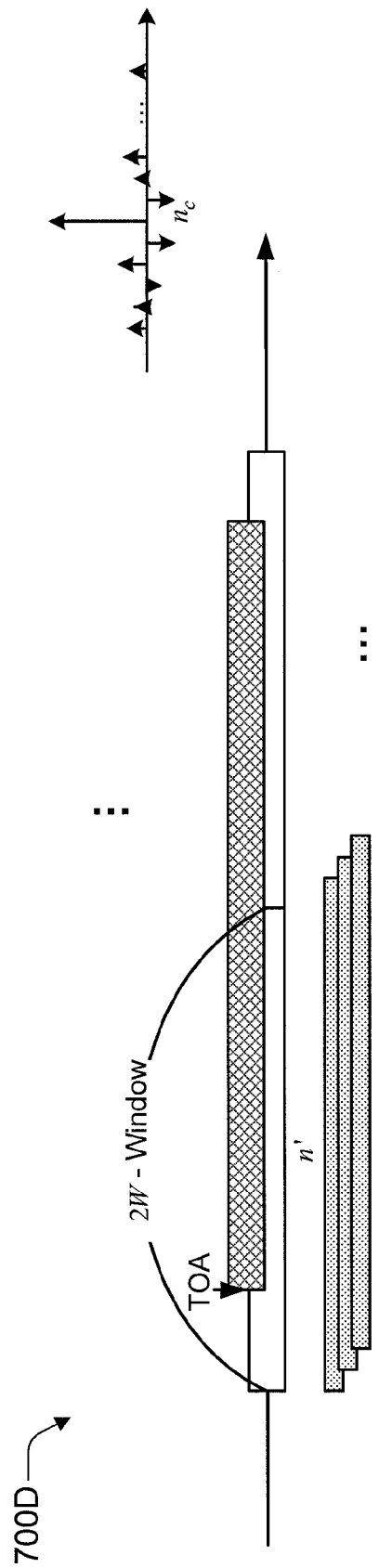

ACOUSTIC RANGING

RELATED APPLICATIONS

This patent application claims priority to U.S. Provisional Patent Application No. 60/942,739 to Shen et al., entitled "Mobile Device Collaboration," filed Jun. 8, 2007 and incorporated herein by reference.

BACKGROUND

Acoustic ranging may entail detecting proximity and/or distance between a first device and a one or more other devices using at least one acoustic signal. Existing approaches usually involve using specialized hardware, especially hardware that includes an extensive fixed infrastructure. Existing techniques usually involve a reliance on local clock times at individual devices. Thus, existing approaches do not enable spontaneous acoustic ranging in ad hoc environments or with general commercial off-the-shelf (COTS) devices. Furthermore, the use of local clock times in existing techniques introduces temporal uncertainties that lead to large ranging errors.

SUMMARY

Acoustic ranging may involve determining a distance between a first device and at least one other device using one or more acoustic signals. In an example embodiment, a first device emits a first acoustic signal and then receives the first acoustic signal at a first time. The first device also receives a second acoustic signal at a second time, with the second acoustic signal having been emitted by a second device. The first device ascertains a first value that reflects a difference between the first time and the second time. Responsive to at least the ascertained first value, the first device determines a distance between the first device and the second device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, apparatus, device, media, procedure, API, arrangement, etc. embodiments are described herein.

BRIEF DESCRIPTION OF THE DRAWINGS

The same numbers are used throughout the drawings to reference like and/or corresponding aspects, features, and components.

FIGS. 7A-7D are diagrams illustrating an example combined signal energy and cross-correlation approach to detection of a received acoustic signal.

DETAILED DESCRIPTION

1: Introduction to Acoustic Ranging

Figure 1:
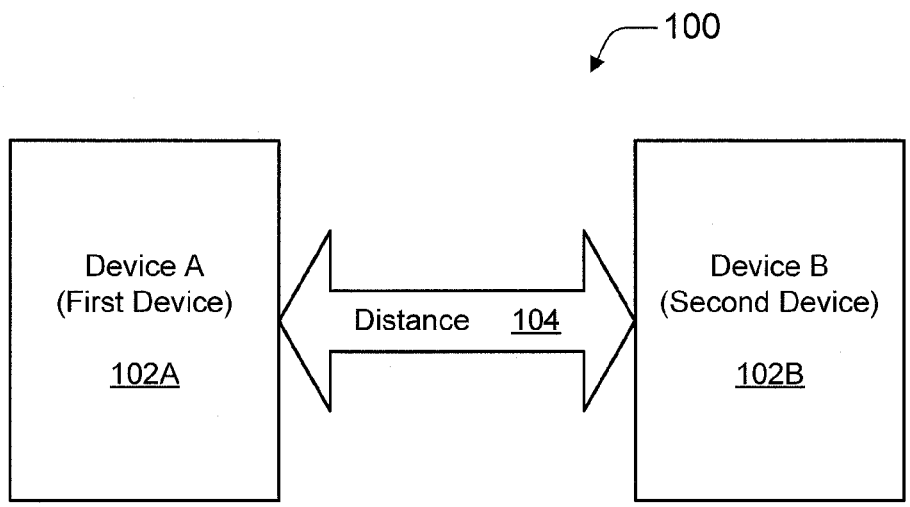
FIG. 1 is block diagram illustrating two devices that are adapted to perform an example ranging procedure to determine a distance between them.

High accuracy ranging using a basic set of commodity hardware capabilities (e.g., a speaker, a microphone, and some form of inter-device communication) can enable the implementation of ad hoc, widespread, and readily-available acoustic ranging procedures. Such implementations can enable the wide-spread use of range sensing in mobile applications. This is true because the above-identified set of hardware capabilities can be considered a common denominator of many sensor platforms and mobile devices, including many commercial off-the-shelf (COTS) devices like cell phones, PDAs, MP3 players, and so forth. Compared to conventional alternatives that require special-purpose hardware and/or the pre-existence of precision location infrastructure, a commodity-based approach can potentially enable wider applications and cost less. To further enable widespread use, especially with COTS devices, an example embodiment can be implemented in software, including partially or even fully in the user-space. COTS devices as used herein refers to those off-the-shelf devices that are not specially-designed to perform acoustic ranging. However, certain principles as described herein may also be employed, in addition to COTS devices, in devices that are specially-designed to perform ranging procedures.

High accuracy ranging is traditionally achieved through measuring time-of-arrival (TOA) information of acoustic or radio signals. The distance is the product of the signal speed and the time of flight of the signal traveling between two devices. The ranging accuracy thus depends on the signal speed and the precision of the TOA measurement. To elevate the accuracy of the distance determination, acoustic signals are usually selected because of their relatively slow speed. Nevertheless, the precision of TOA measurement remains a big challenge in any system implementation if ranging accuracy is desired.

In practice, TOA measurement is often performed with both sides taking a timestamp of their respective local clock at the moment the signal is emitted or received. Unfortunately, there are three intrinsic uncertainties in this technique that can contribute to inaccuracy in the ranging results. These uncertainties include: the possible clock skew and drift between devices, the possible misalignment between the sender timestamp and the actual signal emission, and the possible delay of a sound signal arrival being recognized at the receiver. In general, many factors can cause the latter two uncertainties in a real system, such as the lack of real-time control, software delay, interrupt handling delay, system loads, and so forth. These uncertainties, if not controlled, can seriously affect the ranging accuracy. For example, our tests on two COTS mobile devices reveal that these two delays can easily add up to several milliseconds on average, which translates to several feet of ranging error.

It is therefore challenging to provide high accuracy ranging in a software-only and device-agnostic (especially commodity-type device) solution using the minimum commodity hardware set that is identified above. For the solution to be applicable to many standard COTS mobile devices, there are additional constraints. For example, it cannot be assumed that there is a real-time operating system (OS) or that the kernel or driver can be changed. In fact, many COTS devices like cell phones are built on closed platforms, and many often have operator-imposed locks that prevent changing the OS. Thus, to operate on these types of commodity devices, the ranging mechanism is to be executed in the user-space. Consequently, conventional timestamping approaches cannot provide sufficiently high accuracy.

In contrast, for certain example embodiments, high-accuracy acoustic ranging mechanisms may be implemented in software and/or with COTS devices, including mobile COTS devices. One or more of the following example techniques may be employed: two-way sensing, self-recording, and sample counting. In an example embodiment, two devices each in turn first emit a specially-designed acoustic signal within one second of each other. Meanwhile, each device also records a few seconds of continuous sound from its microphone. Each recording then contains exactly two received special signals that are picked up by its microphone-one emitted from the other device and one from itself. Next, each device counts the number of sound samples between the two acoustic signals and divides the number by the sampling rate to get the elapsed time between the two signal TOA events. The devices further exchange the elapsed time information with each other. The differential of these two elapsed times is related to the sum of the time of flight of the two acoustic signals and hence the two-way distance between the two devices.

By using sample counting instead of timestamping, a ranging mechanism may mitigate the software-hardware interface uncertainties as listed above. It also avoids the source of some of the inaccuracies present in traditional timestamp approaches. In fact, certain example embodiments have no notion of a local clock or timestamp at all. The granularity of certain described embodiments is inversely proportional to the sound sampling rate—the higher the sampling rate, the lower the granularity. By way of example only, under today's prevailing hardware standard of a 44.1 KHz sampling rate, a ranging accuracy of 0.8 cm can be achieved.

Other general and specific example embodiments are described herein below. It should be understood that certain example embodiments as described herein may be employed with COTS devices (mobile, fixed, wireless, wired, combinations thereof, etc.) and/or with special-purpose devices that are designed to perform ranging procedures. Also, although certain example aspects may be described herein in a specific context of hardware or software, such description is by way of example only. In other words, the example embodiments described herein may be implemented fully or partially in hardware, software, firmware, fixed logic circuitry, combinations thereof, and so forth.

2: Applications and Challenges 2.1: Example Applications

High accuracy ranging and localization systems are applicable to more platforms and suitable for more applications if the systems are implementable in software and executable on commodity hardware. They may also reduce the costs to perform ranging in sensor networks.

Besides sensor networks, accurate ranging and/or proximity information can be applied in everyday mobile applications. Examples include, but are not limited to: multi-device applications like precision asset location and touch-to-connect pairing in ad hoc networking, collocated multi-users applications like spontaneous interaction and collaboration, simultaneous photo sharing, and "better-together" video viewing. With high-accuracy ranging, fine-grained spatial control can be provided, and context-aware systems can be developed. For example, sharing can be automatically terminated once a party goes outside a certain proximity in a co-located sharing scenario. Similarly, video playback can be dynamically expanded to two screens or shrunk to one screen as the other device approaches and leaves in a better-together-viewing scenario.

2.2: Challenges of TOA Estimation

Time-of-arrival (TOA) based systems estimate the distance D between the sender and the receiver to be the product of the time-of-flight (i.e., the time ($\Delta t$) it takes a signal such as sound, radio, or light wave to reach the receiver) and the propagation speed c of the signal, which is usually assumed to be a constant that is known a priori.

$$D = c \cdot \Delta t \quad (1)$$

Given that precision is typically considered important, an acoustic signal is usually chosen because the speed of radio or light signals is so fast that a small timing error can lead to an unacceptably large ranging error. However, even if the relatively slower acoustic signal is used, the precision requirements on TOA estimations are still very stringent. For example, a one millisecond error in a TOA estimation translates to more than a 30 centimeter error in the ranging result.

Traditionally, TOA measurement is performed with both sides taking a timestamp of their respective local clock at the moment the signal is emitted or received. There are several intrinsic uncertainties in this process that contribute to the TOA measurement error. A first uncertainty is a clock synchronization uncertainty ($\mu_c$): the possible clock skew and drifting between the two devices. Many approaches have been proposed to address the clock synchronization uncertainty. Some rely on GPS for time synchronization, and some others implement a work-around by using round-trip time measurement (which assumes a symmetric propagation path) so that all time readings refer to the same clock. Most of these solutions have resorted to dedicated mechanisms.

A second uncertainty is a sending uncertainty ($\mu_s$): the possible misalignment between the timestamp and the actual signal emission. For example, there is often a small yet arbitrary delay after an output command is issued until the sound is actually projected from the speaker. Similarly, a third uncertainty is a receiving uncertainty ($\mu_r$): the possible delay of an acoustic signal arrival being recognized. In general, many factors can cause these two sending and receiving uncertainties in a real system, such as the lack of real-time control, software delay, interrupt handling delay, system loads, and so forth.

There has been relatively little work in addressing the sending and receiving uncertainties in software. Most previous work managed to reduce them by resorting to customized hardware design so that the system can precisely control and obtain the exact instant when a signal is sent or received. This hardware approach is clearly inapplicable to software implementations that are executed on commodity hardware.

We have conducted an experiment using COTS mobile phones to understand how large these two sending and receiving uncertainties can be in a general purpose mobile device. The experiment was designed to ascertain a lower bound for a sum of the two uncertainties, given as equation (2) below:

$$(\mu_s + \mu_r), \quad (2)$$

if a TOA measurement is performed in software. The results indicate that $\mu_s + \mu_r$ appears to be very random and affected heavily by the CPU load. Both the average and deviation increases when the load becomes heavy, such as when playing a video, even if we assign the test program the highest priority. Regardless, the experiment indicates that the uncertainties can easily add up to several milliseconds. These several milliseconds of uncertainty translate to several feet of ranging error when the TOA measurement is performed in software.

3: Example Acoustic Ranging Mechanisms

Certain example embodiments can provide accurate ranging results, even while relying on the capability of COTS devices. Each of the three aforementioned uncertainties (i.e., clock synchronization uncertainty, sending uncertainty, and receiving uncertainty) can at least be ameliorated, if not avoided. In this section, example embodiments for a ranging mechanism, as well as the underlying concepts that can provide precision results, are described.

3.1: Example Ranging Schemes

Without loss of generality, we focus initially on ranging procedures with two devices, say device A and device B. The principles and techniques are expanded to multiple devices further below (e.g., Section 4.4).

FIG. 1 is block diagram illustrating two devices 102 that are adapted to perform an example ranging procedure 100 to determine a distance 104 between the two devices 102. As illustrated, a device A (i.e., a first device 102A) and a device B (i.e., a second device 102B) are adapted to perform a ranging procedure 100. The result of ranging procedure 100 is a distance 104 that indicates to a determinable granularity the distance between device A and device B. In an example embodiment, devices 102 may be COTS mobile device. However, in alternative embodiments, specialized and/or fixed devices may also implement ranging procedure 100.

Figure 2:
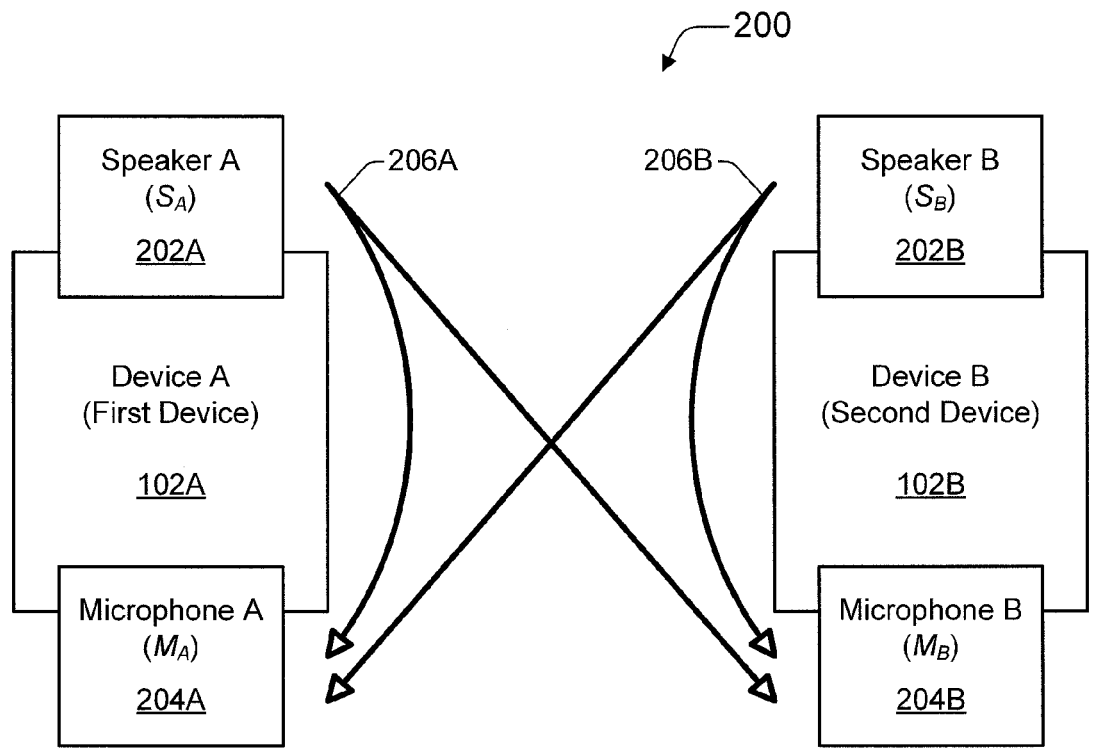
FIG. 2 is a block diagram of a ranging procedure being performed by two example devices using speakers, microphones, and two acoustic signals.

FIG. 2 is a block diagram of a ranging procedure 200 that is being performed by two example devices 102 using speakers 202, microphones 204, and acoustic signals 206. As illustrated, device A 102A includes a speaker A ($S_A$) 202A and a microphone A ($M_A$) 204A. Device B 102B includes a speaker B ($S_B$) 202B and a microphone B ($M_B$) 204B. Acoustic signals 206 may be audible sound, ultrasound, and so forth.

In an example embodiment, speakers 202 and microphones 204 are integrated with their respective devices 102. However, they may alternatively be otherwise coupled thereto. Furthermore, speakers 202 and microphones 204 may be positioned at different locations on each device 102 from those locations that are illustrated. Each device 102 may also have a different number of speaker(s) and/or microphone(s) 204 from what is illustrated in FIG. 2.

In an example embodiment, each device emits an acoustic signal 206 in any order, but usually at different times. Specifically, device A 102A causes its speaker A 202A to emit acoustic signal 206A. Acoustic signal 206A is then received at microphone A 204A of device A 102A and at microphone B 204B at device B 102B. Similarly, device B 102B causes its speaker B 202B to emit acoustic signal 206B. Acoustic signal 206B is then also received at microphone A 204A of device A 102A and at microphone B 204B at device B 102B. How a ranging procedure 200 may be performed using these two acoustic signals 206A and 206B and the four receptions thereof is described below.

An example embodiment of the basic ranging scheme may be characterized as having three steps. In a first step, a two-way sensing is performed, as shown in FIG. 2. Assume both devices are in recording state. Device A first emits an acoustic signal through its speaker $S_A$. This signal is recorded via its own microphone (e.g., a self-recording is performed) as well as that of the other device B. Then, device B emits another acoustic signal back through its speaker $S_B$. This other acoustic signal is also recorded via both microphones at the two devices A and B.

In a second step, both devices A and B examine their recorded data and locate the sample points when the previously-emitted two acoustic signals arrived. We denote the time difference between these two acoustic signal arrivals as elapsed time between the two time-of-arrivals (ETOA). [We use the term ETOA herein so as to differentiate from the well defined term DTOA (differential times of arrival) or TDOA (time differences of arrival), which usually refers to the differential between two TOAs measured at two different receivers using the same sound source.] In a third step, the two devices A and B exchange their locally-measured ETOA values. The distance between the two devices can then be computed responsive to these two values.

Figure 3:
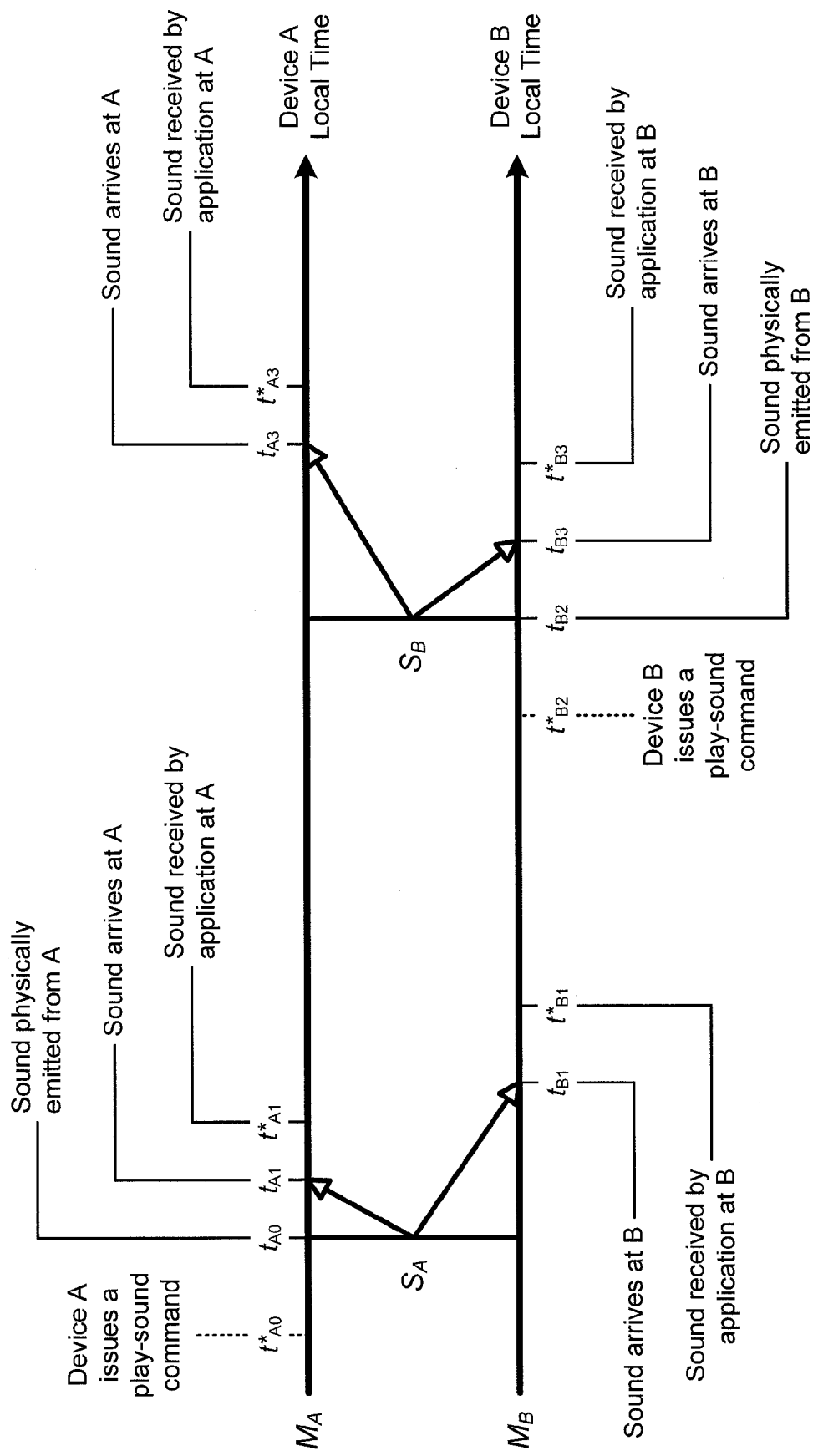
FIG. 3 is a timeline that depicts an example first stage of an acoustic ranging procedure.

FIG. 3 is a timeline 300 that depicts an example first stage of an acoustic ranging procedure. More specifically, timeline 300 illustrates timing relations among events when performing a two-way sensing in the first stage. Two time lines are drawn in the figure, with the upper one presenting the local time of device A and the bottom one presenting the local time of device B.

We denote $t^*_{A0}$ the time when device A instructs its speaker $S_A$ to emit the sound signal. However, due to the sending uncertainty, the actual time when the speaker physically emits may be $t_{A0}$. The time of the acoustic signal arrival at the microphones $M_A$ and $M_B$ of devices A and B, respectively, are marked as $t_{A1}$ and $t_{B1}$, respectively. Due to the receiving uncertainty, respective applications on devices A and B may not obtain these signal data until respective times $t^*_{A1}$ and $t^*_{B1}$.

Similarly, we denote $t^*_{B2}$ and $t_{B2}$ as the time when device B instructs its speaker $S_B$ to send out a sound signal and when the signal is physically emitted, respectively. Variables $t_{A3}$ and $t_{B3}$ denote the times when the acoustic signal from device B arrives at the microphones $M_A$ and $M_B$ of devices A and B, respectively. The time variables $t^*_{A3}$ and $t^*_{B3}$ denote the times when the respective applications on devices A and B actually detect the arrival of the acoustic signal data.

We denote $d_{x,y}$ as the distance between the device x's speaker and the device y's microphone. From equation (1) above, the following four distance equations (3)-(6) can be derived:

$$d_{A,A} = c \cdot ((t_{A1} - t_{A0}) \tag{3}$$

$$d_{A,B} = c \cdot (t_{B1} - t_{A0}) \tag{4}$$

$$d_{B,A} = c \cdot (t_{A3} - t_{B2}) \tag{5}$$

$$d_{B,B} = c \cdot (t_{B3} - t_{B2}) \tag{6}$$

where c is the speed of sound.

Using equations (1) and (3)-(6), the distance between the two devices D can be approximated as shown below in equation (7):

$$D = 1/2 \cdot (d_{A,B} + d_{B,A}) \tag{7}$$
$$= c/2 \cdot ((t_{B1} - t_{A0}) + (t_{A3} - t_{B2}))$$

$$= c/2 \cdot (t_{B1} - t_{B2} + t_{B3} - t_{B3} + t_{A3} - t_{A0} + t_{A1} - t_{A1})$$

$$= c/2 \cdot ((t_{A3} - t_{A1}) - (t_{B3} - t_{B1}) + (t_{B3} - t_{B2}) + (t_{A1} - t_{A0}))$$

$$= c/2 \cdot ((t_{A3} - t_{A1}) - (t_{B3} - t_{B1})) + d_{B,B} + d_{A,A}$$

In equation (7), the latter two terms are the distances between the speaker and microphone of each of the two devices B and A. This distance is a constant in a given device and may be measured a priori. Consequently, the distance D between the two devices can be determined responsive to the first two terms, which are actually the ETOA values measured by device A and B, respectively.

It should be noted that the ETOA may be calculated by each individual device independently, i.e., without referring to any timing information from the other device. Hence, no clock synchronization between the devices needs be established. Moreover, due to the self-recording strategy, each time measurement is associated with the arrival instants of the acoustic signals; consequently, the sending uncertainty is also ameliorated. In the next subsection, we show how a relatively precise ETOA may be obtained.

3.2: Example ETOA Determination

In a typical computing system that has multiple layers of hardware and/or software, obtaining the exact time instance when a signal arrives is difficult due to the indeterministic latency introduced by the hardware and software (i.e., the receiving uncertainty). In an example embodiment, this receiving uncertainty may be at least ameliorated by not referring to any local clock but instead inferring timing information directly from recorded sound samples.

Realizing that the received sound signal is usually sampled at a fixed frequency (which is represented herein by sampling frequency $f_s$) by the analog-to-digital (A/D) converter, we can directly obtain an ETOA by counting the sample number between the two TOAs of the acoustic signals from the recorded data. Interaction with the local clock of the end system may therefore be avoided. In other words, we need not rely on the end system to set the timestamp to a value that it "thinks" the signal has arrived. Rather, we turn to the fidelity of the recording module. Because the sound signals are recorded, we can check the recorded data and identify the first sample point of each signal. The ETOA can thus be obtained, at least in part, by counting the number of samples between the first samples of the two corresponding received acoustic signals.

It should be noted that this technique can also avoid having to perform an instantaneous signal detection; it may instead shift the signal detection task out of the sensing stage. Because the received acoustic signals are sampled and recorded, the signal detection may be conducted at a subsequent time, or even offline. As a consequence, more complex signal processing techniques can be utilized in certain embodiments without requiring special hardware support or critical speed optimization.

With sample counting to reflect the time differences as described above, equation (7) can be rewritten as follows:

$$D = \frac{c}{2} \cdot \left( \frac{n_{A3} - n_{A1}}{f_{sA}} - \frac{n_{B3} - n_{B1}}{f_{sB}} \right) + K, \quad (8)$$

where $n_x$ denotes the index of the sample point at instant $t_x$; $f_{sA}$ and $f_{sB}$ are the sampling frequency of device A and B, respectively; and $K = d_{B,B} + d_{A,A}$ is a constant. Herein below, without loss of generality, we will assume that the sampling frequency is to be 44.1 kHz unless otherwise explicitly noted because the 44.1 kHz sampling frequency is the basic, de facto standard that almost every sound card supports. In cases with equal sampling frequencies at both devices, we have $f_{sA} = f_{sB}$. Equation (8) from above is then simplified as in equation (9) below:

$$D = \frac{c}{2 \cdot f_s} \cdot ((n_{A3} - n_{A1}) - (n_{B3} - n_{B1})) + K. \quad (9)$$

By using sample counting instead of timestamping, example mechanisms as described herein can avoid the source of inaccuracies found in traditional timestamp approaches. In fact, when such mechanisms are employed, certain example embodiments need have no notion of a local clock or timestamp. From equation (8), the measurement granularity is positively proportional to the sound speed c and inversely proportional to the sampling frequency $f_s$. With typical settings of c=340 meters per second and $f_s$=44.1 kHz, the distance granularity is approximately 0.77 centimeters. The granularity can be further improved if higher sampling frequencies can be afforded.

Figure 4:
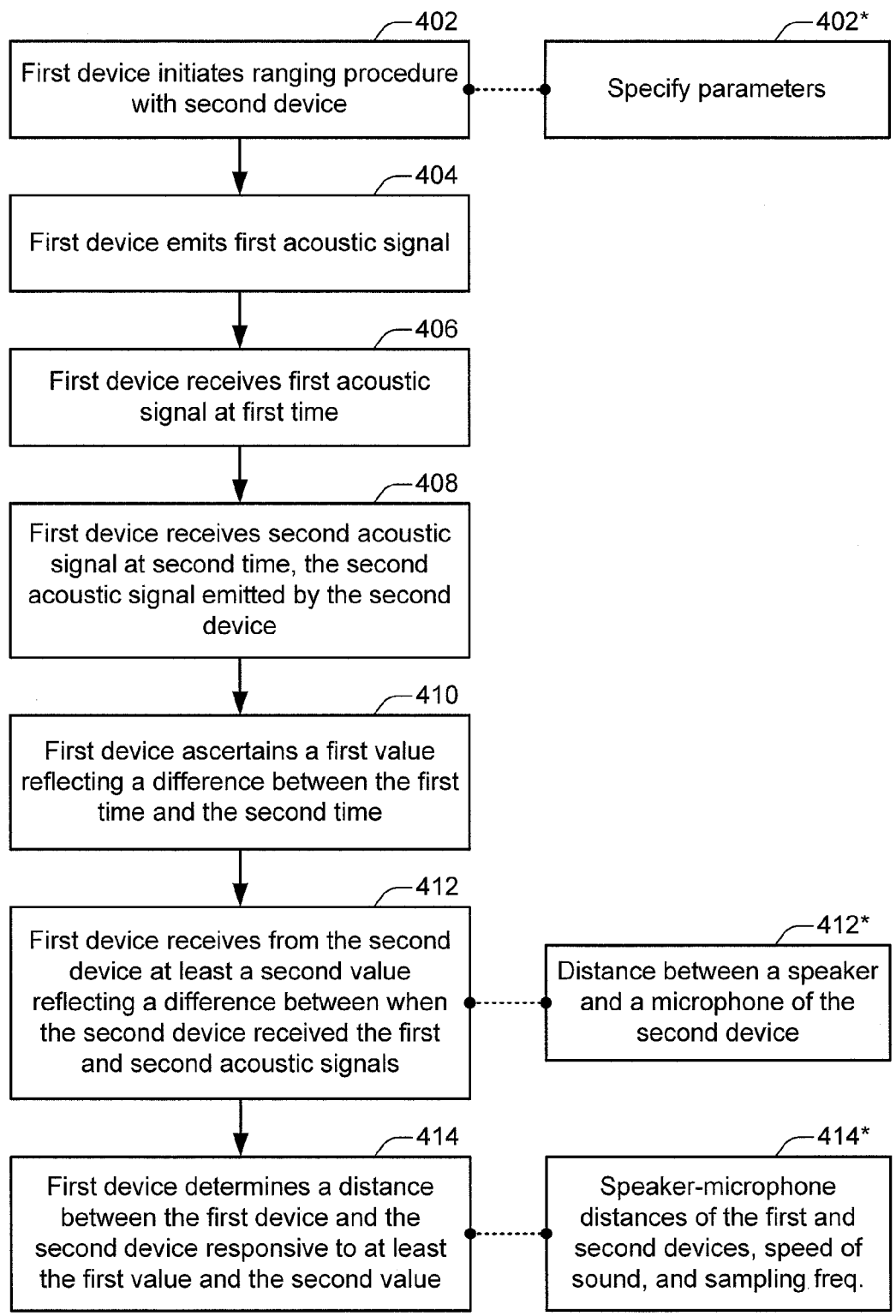
FIG. 4 is a flow diagram that illustrates an example of a method for performing an acoustic ranging procedure.

FIG. 4 is a flow diagram 400 that illustrates an example of a method for performing an acoustic ranging procedure. Embodiments of flow diagram 400 may be realized, for example, as processor-executable instructions. Processor-executable instructions may be embodied as software, firmware, hardware, fixed logic circuitry, some combination thereof, and so forth. The acts of these flow diagrams may be performed in many different environments, with a number of different devices, and/or under a variety of different communication configurations. The order in which the method is described is not intended to be construed as a limitation, and any number of the described blocks can be combined, augmented, rearranged, and/or omitted to implement a respective method, or an alternative method that is equivalent thereto.

Flow diagram 400 includes seven (7) "primary" blocks 402-414, plus blocks 402*, 412*, and 414*. The description of flow diagram 400 includes references to other figures, such as FIGS. 1, 2, and 3. In an example embodiment of flow diagram 400, at block 402, a first device initiates a ranging procedure with a second device. For example, device A 102A may initiate a ranging procedure 100 with device B 102B using a transmission on a wireless communication channel.

The initiation may be effectuated, for example, via some wireless medium using one or more messages over a given communication channel. Any communication technology may be used by the two devices. Examples include, but are not limited to, Wi-Fi, BLUETOOTH®, UWB, other radio frequency (RF) communication channels, infrared (IR) communication channels, acoustic communication channels, combinations thereof, and so forth. Moreover, such messages may also be transmitted and/or received via one or more wired communication channels. The application can select a desired communication channel. A same or different communication channel can be used to effectuate the other communications among the devices participating in the ranging procedure.

At block 402*, the ranging procedure initiation may entail the specification of parameters. By way of example only, device A can trigger a proximity determination by sending a request to other device(s). The parameters can be set to default values or be selected through a hand-shaking protocol. Examples of variable proximity determination parameters include, by way of example but not limitation: source sound (e.g., chirp or pseudo noise sound, sound frequency band, signal length, etc.), rough sound, A's playtime, B's playtime strategy (e.g., immediately or otherwise prior to A, at a predefined time window, after detection of A's acoustic signal, etc.), recorder stop condition (e.g., pre-defined recording duration, waiting for a stop signal, etc.), and so forth. Device B may affirmatively acknowledge the proximity determination request. After a successful hand-shaking, the recorders at both of the devices may be started.

At block 404, the first device emits a first acoustic signal. For example, device A 102A may emit a first acoustic signal 206A from a speaker A 202A. At block 406, the first device receives the first acoustic signal at a first time. For example, device A 102A may receive first acoustic signal 206A at its microphone A 204A at a first time.

At block 408, the first device receives a second acoustic signal at a second time, with the second acoustic signal having been emitted by the second device. For example, after device B 102B has emitted a second acoustic signal 206B, device A 102A may receive second acoustic signal 206B at its microphone A 204A at a second time. The times may be implemented in any manner. Examples include, but are not limited to, timestamps from a local or global clock, index sample points/numbers at a predetermined sampling frequency of an A/D converter, and so forth.

At block 410, the first device ascertains a first value reflecting a difference between the first time and the second time. For example, device A 102A may ascertain a first value that reflects a difference between the first and second times. For instance, the first value may represent an elapsed time between the two time-of-arrivals (ETOA) as ascertained at device A 102A.

At block 412, the first device receives from the second device at least a second value reflecting a difference between when the second device received the first and second acoustic signals. For example, device A 102A may receive in a wireless (or wired) transmission from device B 102B at least a second value that reflects a difference between when device B 102B received first acoustic signal 206A and when it received second acoustic signal 206B. For instance, the second value may represent the ETOA as ascertained at device B 102B.

At block 412*, the first device may also receive from the second device a distance between a speaker and a microphone of the second device. For example, device A 102A may also receive from device B 102B a distance between speaker B 202B and microphone B 204B of device B 102B. This speaker-microphone distance $d_{B,B}$ may be provided during the initiation/handshaking of blocks 402 and 402* or during the communication of the second value of block 412. Alternatively, device A 102A may be programmed with this speaker-microphone distance information fore each of multiple different types of devices, which type may be identified during the initiation/handshaking of blocks 402 and 402*.

At block 414, the first device determines a distance between the first device and the second device responsive to at least the first value and the second value. For example, device A 102A may determine a distance D between device A 102A and device B 102B responsive to at least the first ETOA as ascertained at device A 102A and the second ETOA as ascertained at device B 102B. At block 414*, the first device may further determine the distance between the first and second devices responsive to one or more of the following: the speaker-microphone distances of the first and second devices, the speed of sound, or at least one sampling frequency. For example, the distance D may further be determined responsive to a first dimension reflecting a speaker-microphone distance $d_{A,A}$ of the first device; a second dimension reflecting a speaker-microphone distance $d_{B,B}$ of the second device; the speed of sound c; or at least one sampling frequency of $f_s$, $f_{sA}$, or $f_{sB}$ based on one or more of equations (7), (8), or (9).

3.3: Examples of Signal Design and Detection

Achieving high ranging precision usually entails attempting to precisely locate the first signal sample in recorded acoustic signal samples. This can be particularly challenging for COTS mobile devices because, in general, the speakers and microphones in such devices have only a limited capability (e.g., they often have a narrow spectrum support). Furthermore, when working in an indoor environment, acoustic signals can arrive at a microphone destination through multiple paths with different delays. This multipath effect may cause ambiguous ETOA detection and therefore significantly reduce the detection accuracy if it is not handled well. Signal design and detection is addressed further herein below, particularly in Section 4.

3.4: Sources of Errors

Possible sources of errors are summarized in this subsection. According to equation (9), there are three possible sources of errors relating to the following three parameters: sound speed c, sampling frequency $f_s$, and TOA detection (e.g., various sample indices $n_t$). For example, the propagation speed of sound c in the air varies with temperature and humidity, and the sampling frequency $f_s$ may drift. Fortunately, their impacts are usually negligible in practice, and their impacts can be mitigated by taking temperature and humidity into consideration using well-established sound speed models and by shortening the sensing interval, respectively.

For certain example embodiments, while implementing ETOA avoids associating the TOA of an acoustic signal to the local clock of the device, there are still other factors that may influence the detection precision of the TOA. These other factors include signal-to-noise ratio, multipath effects, and signal distortion. They are discussed separately below.

Signal to noise ratio (SNR)—the received acoustic signal will likely be attenuated and distorted by the communication channel. Furthermore, the environmental noise may be usually colored. SNR may also be affected by the energy used when transmitting the signal from the sender.

Multipath effects—the acoustic signal may reach the receiver via different paths due to reverberation. The received signal is thus a combination of signals from a number of the possible paths that traverse the position of the microphone.

Signal distortion—the hardware (e.g., the microphone and speaker) of a mobile device usually has good support for only a relatively limited spectrum band (e.g., around 3 kHz) because their primary targeted usage is for voice communication. Attenuation differs at different frequency bands. The dynamic range of the speaker's volume is also very limited. It can be relatively easy to reach saturation and thus cause large waveform distortion.

4: Example System Architectures and Implementations

4.1: Overview

Unlike traditional ranging or localization systems, certain embodiments as described herein may be implemented as a pure software solution that does not require specialized hardware design or modifications to the commercial OS. In fact, example software embodiments may be implemented completely at the application-layer, including on many ordinary COTS mobile devices. Moreover, the software system may be architected as a ranging service so that it can be readily used by other applications. However, it should be understood that embodiments for acoustic ranging as described herein may generally be implemented fully or partially in hardware, firmware, fixed logic circuitry, software, some combination thereof, and so forth.

Figure 5:
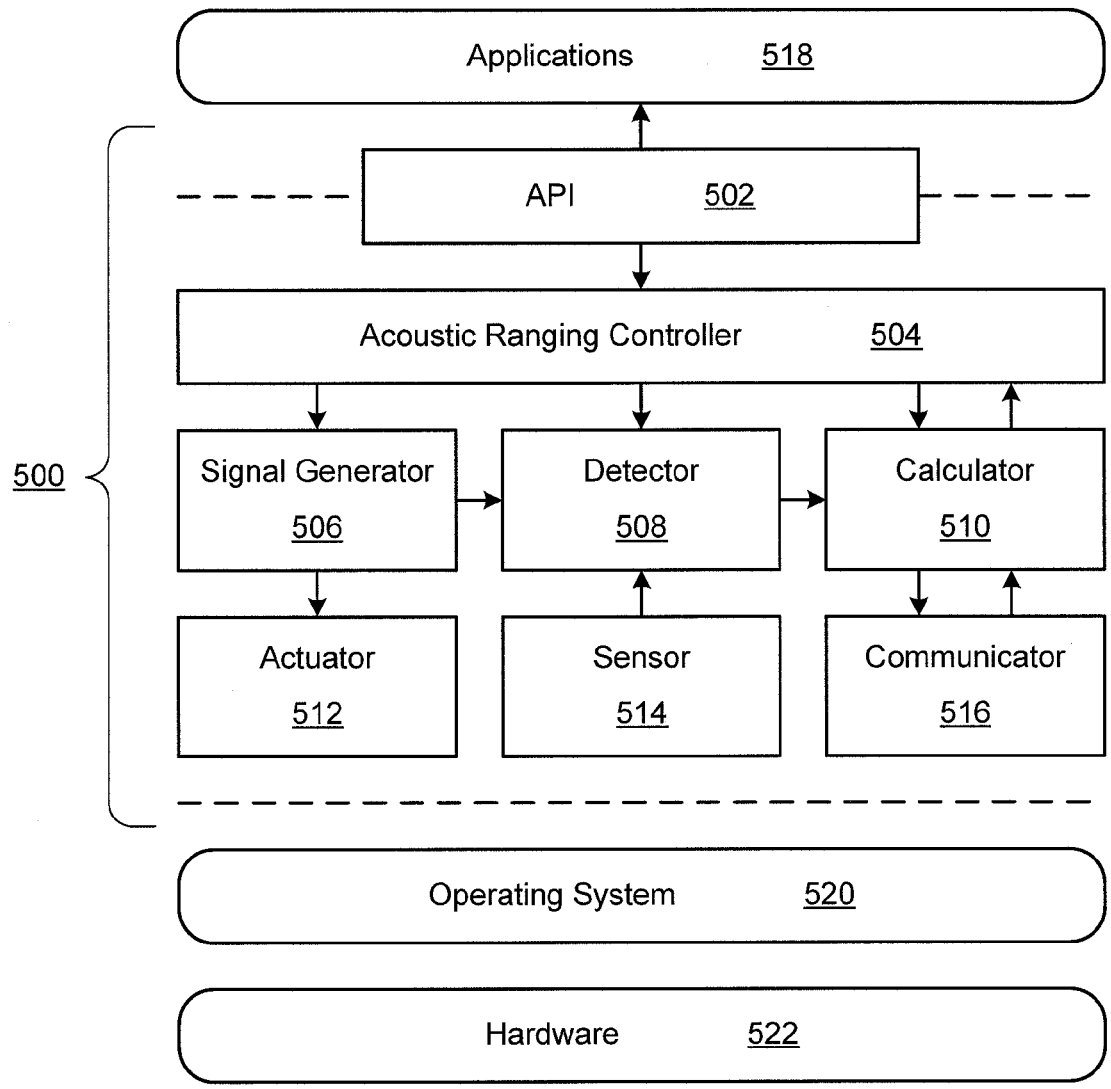
FIG. 5 is a block diagram that illustrates an example software architecture for acoustic ranging.

FIG. 5 is a block diagram that illustrates an example software architecture 500 for acoustic ranging. As illustrated, software architecture 500 includes an application programming interface (API) 502 and an acoustic ranging controller 504. It also includes a signal generator 506, a detector 508, a calculator 510, an acoustic signal actuator 512, an acoustic signal sensor 514, and a communicator 516. A device (e.g., 102 of FIGS. 1 and 2) on which software architecture 500 is executing may also include one or more applications 518, at least one operating system 520, and hardware 522. An example device is described further herein below with particular reference to FIG. 9.

In an example embodiment, software architecture 500 includes three major parts: the interface to other applications (e.g., API 502), the core logic part (e.g., acoustic ranging controller 504 and modules 506-510), and underlying physical-device-related function modules (e.g., modules 512-516). The physical-device-related function modules include actuating module 512 that emits the acoustic signal that is generated by signal generator 506. Sensing module 514 records (e.g., continuously) the received sounds into a local buffer and feeds the buffered data to signal detector 508. Communication module 516 enables information (e.g., light-weight information) exchange between participating devices. By way of example only, such information may include the ETOA data, scheme specific parameters, speaker-microphone distances, and so forth.

The core logic part of software architecture 500 includes acoustic ranging controller 504, signal generator 506, signal detector 508, and distance calculation module 510. Acoustic ranging controller 504 controls and orchestrates the actions of the other modules to perform the acoustic ranging functions described herein. It also interacts with other applications 518 by receiving requests and sending back responses through API 502. A local timer may be maintained in acoustic ranging controller 504 for ranging signal scheduling.

Signal generator 506 generates the waveform of the ranging signals based on provided parameters and feeds the generated signal to actuating module 512. The generated signals are also stored as reference signals and provided to detector 508 for signal detection. Signal detector 508 implements the signal detection algorithms and determines the indices of the first samples (i.e., the TOAs) of other participants' signals as well as its own. Ranging signals are detected by matching the recorded data from the sensing module 514 against their respective reference signal templates. Distance calculation module 510 calculates the distance D to other participants after receiving the respective ETOAs in accordance with at least one of equations (7), (8), (9).

By way of example only, software architecture 500 may be implemented in conjunction with a mobile-oriented operating system 520, such as WINDOWS® MOBILE® 5.0. For instance, example embodiments of acoustic ranging as described herein may be developed as a user-mode dynamic linkable library (DLL) that other applications can load and use for ranging services. The multimedia services that are embedded in WINDOWS® MOBILE® can be used to control the microphones and speakers. WINSOCK can be used for communications over Wi-Fi wireless communication channels. However, acoustic ranging generally and software architecture 500 specifically may be realized in other environments and/or in alternative manners, including fully or partially in hardware, firmware, fixed logic circuitry, combinations thereof, and so forth.

4.2: Examples of Acoustic Signal Design

To facilitate detection, the acoustic signal may be designed to have a good autocorrelation property, which permits accurate signal detection when receiving ambient noise along with the signal. One signal design that is appropriate is the linear chirp signal, but the range of its spectrum is to be adjusted to abide by the constraints of the hardware capabilities of the speaker and microphone in COTS devices, if the system is to operate well on such COTS devices. Because most of these speaker and microphone hardware items are designed knowing that the primary application is voice conversation, it is natural that they have better frequency response around the narrow spectrum band of the human voice. For typical COTS devices, the sound signal is often greatly attenuated when the frequency is higher than 8 kHz, which is the upper bound of the human voice. Consequently, we select the frequency range of the linear chirp signal to be between 2-6 kHz.

Another potential problem with COTS devices is distortion. One issue that we identified is that the acoustic waveform, when played out, has a very large distortion in the first few milliseconds. To address this issue, the chirp signal is preceded with a five-millisecond 2 kHz cosine waveform to warm up the speaker. In an example implementation, we selected the length of the acoustic signal to be 50 milliseconds, which strikes a good compromise between suppressing multipath effects and noise resistance. It should be understood that the real-world numerical values (and acoustic signal types) presented in this paragraph and elsewhere herein are given by way of example only; other alternative values (and acoustic signal types) may be implemented instead.

4.3: Examples of Signal Detection

In an example embodiment, the acoustic signal may be detected by correlation with the reference signal in the time domain. In one example implementation, the same acoustic (e.g., chirp) signal is used by all ranging participants. Because of this multi-use of a single chirp signal, each acoustic signal is associated with an individual device in order to calculate ETOAs. To differentiate these signals, we employ a schedule-based protocol that allocates a specific respective time window to emit the acoustic signal for each respective participant in a ranging procedure.

Figure 6:
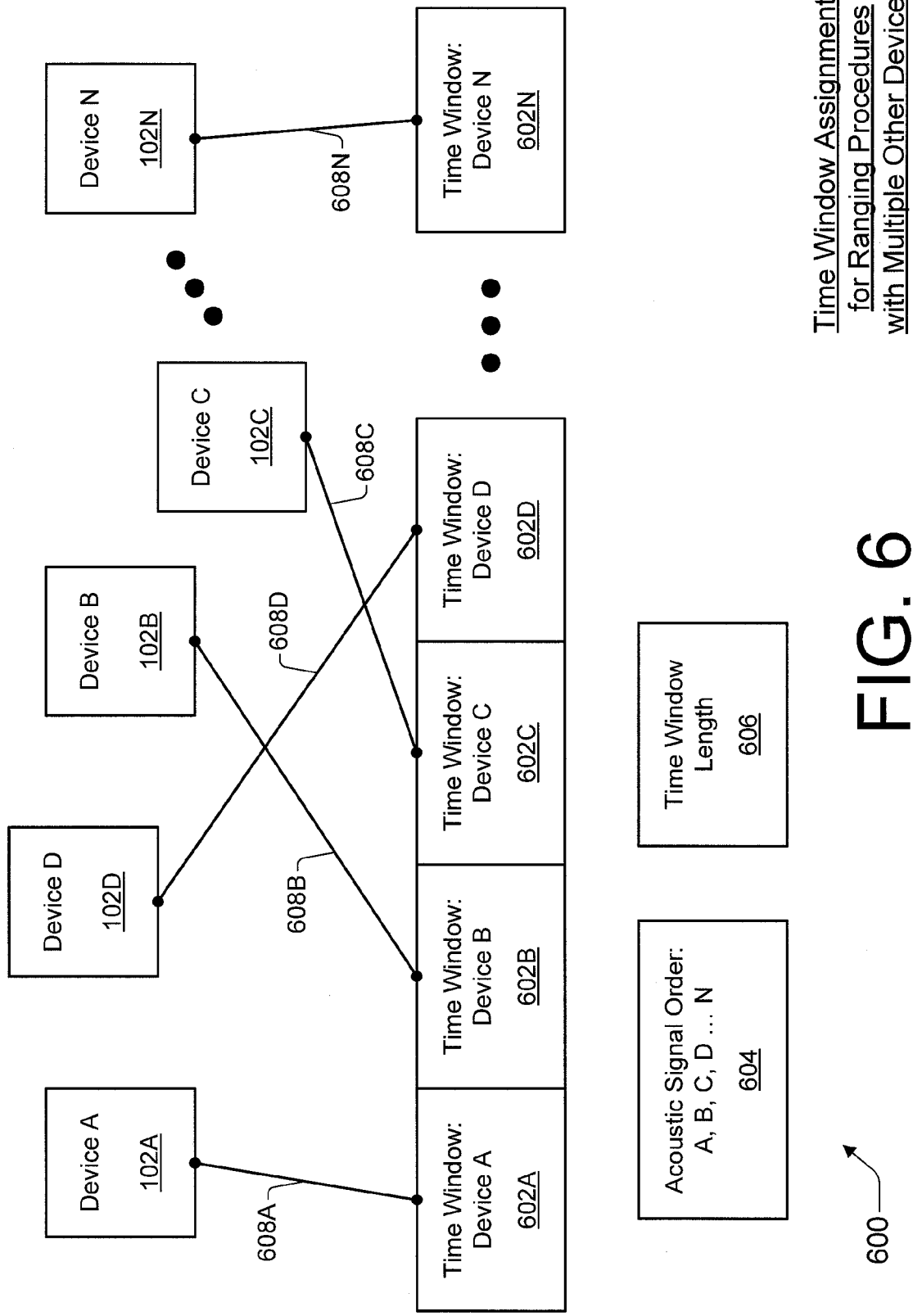
FIG. 6 is a block diagram illustrating a schedule-based protocol having time window assignments for ranging procedures with multiple other devices.

FIG. 6 is a block diagram illustrating a schedule-based protocol 600 having time window assignments 608 for ranging procedures with multiple other devices 102. As illustrated, schedule-based protocol 600 includes "N" devices 102A, 102B, 102C, 102D . . . 102N that are respectively assigned 608A, 608B, 608C, 608D . . . 608N to respective time windows 602A, 602B, 602C, 602D . . . 602N. An acoustic signal order (A, B, C, D . . . N) 604 and a time window length 606 are also shown.

In an example embodiment, schedule-based protocol 600 involves assigning 608 respective devices 102 to respective time windows 602. The initiating device, such as device 102A, determines (e.g., randomly) acoustic signal order 604. Time window length 606 may be determined responsive to the length of the acoustic signal. Each time window 602 is set equal to time window length 606. As described further herein below, device 102A may communicate each devices' 102B . . . 102N respectively assigned time window 602B . . . 602N by sending each device both acoustic signal order 604 and time window length 606.

Alternatively, instead of using a time-windowing protocol with the same acoustic signals being emitted by multiple devices, a pseudo noise or other coded signal may be used to obviate the schedule-based protocol, but at the likely cost of significantly increased signal detection complexity. In other words, scheduling overhead and/or delays can be avoided and the length of the signal communication portion of the procedure may be reduced by using individually identifiable acoustic signals, but the signal detection complexity increases. With coded (e.g., pseudo noise (PN)) signals, even if the coded signals are overlapped, they can still usually be individually identified robustly. This can obviate the use of schedules. For example, in the initiation stage, an initiating device assigns a unique code (e.g., a code according to which a PN signal can be uniquely generated and identified) to each other device that is to participate in the acoustic ranging procedure. Each device then emits an acoustic signal in accordance with its assigned code. The individual respective acoustic signals can be individually identified using the assigned code.

Continuing with schedule-based protocol 600, if the participating devices 102 are not tightly synchronized temporally, time windows 602 are sized appropriately. For example, the scheduled time window length 606 may be set sufficiently large so as to reliably separate acoustic signals from different participating devices. We denote N as the number of samples for the selected acoustic (e.g., chirp) signal. Thus, if the signal length is 50 ms and the sound sampling rate is 44.1 kHz, N equals 2205 sample points.

In an example embodiment, to detect an acoustic signal, the recorded data are correlated with the reference signal and the maximum "peak" is located. This maximum peak is concluded to be the temporal location of an acoustic signal if its cross-correlation value is significantly larger as compared to with background noise. In an example implementation, we calculate the $L_2$-norm of the cross-correlation values within a small window of $w_0$ samples around the peak, $L_2(S)$. Then, we calculate the $L_2$-norm of the correlation values in a $w_0$ window that is at least N samples before the peak, $L_2(N)$, where it is considered to contain only noise. A signal is considered to be detected when $L_2(S)=L_2(N)>TH_{SD}$. If no such quantified point is located, we conclude that the detection failed. Failure may occur because, for example, the signal energy is too weak or the noise level is too high. In an example implementation, we set $TH_{SD}=2$ (i.e., 3 dB) and $w_0=100$.

Especially with an indoor environment, reflection from a secondary path may overlap with the signal from the line-of-sight (LOS) path. Such signal combination may cause the maximum peak to appear at the secondary path, which is slightly temporally lagging as compared to the signal that travels in the primary path. In an example embodiment, the multipath effects are addressed by locating the earliest "sharp" peak in the shadow window. Sharpness characterizes the level of a peak with respect to its surrounding side-lobes. Because cross-correlation values of a signal from different paths likely have similar sharpness, we conclude that the first peak that has sharpness that is comparable to the maximum peak is the TOA of the signal.

In particular, an example process to address multipath may be implemented as follows: First, we calculate the sharpness of a peak as the ratio of the peak value to the average absolute cross-correlation values in its $w_1$ vicinity. Second, we compute all peaks in the shadow window before the maximum peak and find the first one whose sharpness $\gamma_p$ is larger than $\gamma_{max} \times TH_{MP}$, where $TH_{MP}$ is a threshold. In an example implementation, we empirically set $TH_{MP}=85\%$ and $w_1=100$.

Generally, there may be significant work to acquire an accurate TOA in noisy and reverberant environments. As noted above, a typical approach is to locate the peak in the cross-correlation of the received signal and the original acoustic signal reference source. However, the cross-correlation has a large computational cost, and it is wasteful to compute for all received signals. In contrast, for certain example embodiments, signal detection combines signal energy detection and cross-correlation analysis to provide a coarse-grained to fine-grained detection scheme using different scales of the received acoustic signals to relatively rapidly and accurately detect the TOA.

FIGS. 7A-7D are diagrams 700A-700D that illustrate an example combined signal energy and cross-correlation approach to the detection of a received acoustic signal. In diagrams 700A-700D, the blocks with a cross-hatched pattern represent the actual generated acoustic signal. In diagrams 700C-700D, the blocks with the dotted pattern represent the received and recorded acoustic signal.

Firstly, we make use of window energy to roughly locate the possible TOA. In other words, with reference to diagram 700A of FIG. 7A, we find n with the maximal window energy and the next window energy. It should be noted that we shift the N-window without any overlapping each time to reduce a great amount of the computation. Secondly, we adjust the size of the window energy. For example, with reference to diagram 700B of FIG. 7B, the former window size may be halved to be N/2. It may be halved until a satisfactorily accurate position $n_e$ is attained from the window energy.

Thirdly, we calculate s-sampled cross-correlation in a possible window nearby the above-attained rough location. With reference to diagram 700C of FIG. 7C, the down sampling option s is used to reduce the correlation computation, too. A finer TOA (i.e., n') can be obtained from the sampled cross-correlation curve. Fourthly, as indicated by diagram 700D of FIG. 7, the sampled cross-correlation computation is repeated by reducing the window size 2 W and the sampling ratio until a final TOA $n_c$ is obtained at s=1.

In an example implementation, we adopt a hierarchical scheme of using both window energy and cross-correlation in different scales because although the sharp cross-correlation peak of some acoustic signals (e.g., chirp and PN signals) indeed facilitate an accurate TOA detection even in noisy environments, they can decrease rapidly after shifting even a few sampling points from the actual TOA. It becomes incomparable to the correlation of non-reference signals. On the other hand, the signal window energy can be used to indicate a rough temporal location of the TOA.

4.4: Example Ranging Protocols

In this subsection, a ranging protocol of an example embodiment is described. Ranging protocol 600 of FIG. 6 is referenced for the sake of clarity. It is assumed that each device 102 has a radio (e.g, a Wi-Fi radio) and that the devices 102A . . . 102N are therefore coordinated via wireless communications. The protocol can support multiple devices in one ranging procedure, where each of N (N>2) devices is attempting to measure the distances to each of the other devices simultaneously in one overall ranging procedure. The protocol generates N acoustic signals to obtain the pair-wise distance measurements between any two devices for each of the devices in the procedure. This property provides scalability for the ranging mechanism, even when N is large.

In an example embodiment, the ranging protocol includes three steps: First is Initiation—A ranging procedure is started by an initiating device 102A, which calculates and disseminates a schedule in an initiation message sent to each of the other devices 102B . . . 102N that is to participate in the ranging procedure. The schedule of the initiation message may include acoustic signal order 604 and time window length 606. Alternatively, the schedule of the initiation message may directly assign time windows with a respective time offset for each device.

Second is Sensing—Each device calculates a delay according to the schedule and sets a timer. Upon expiration of the timer, the device emits an acoustic signal. Third is ETOA Exchanging—After the last device 102N has emitted its acoustic signal, each device 102 processes the recorded signals and determines a respective ETOA between its own signal and respective signals from each of the other devices. These ETOA values may be packed into one packet and broadcast to the other devices. Upon receiving ETOA information from each of the other devices, each individual device can calculate the distance to each of the other devices using at least one of equations (7), (8), or (9).

In the Initiation step, the initiating device randomly chooses an order (e.g., acoustic signal order 604) for each device to emit an acoustic signal and specifies a time interval (e.g., time window length 606) between two consecutive transmissions of acoustic signals. Defining such a schedule can have two purposes: 1) it schedules each device to emit an acoustic signal at a different time to prevent possible collisions; and 2) it also helps to identify the acoustic signal of each device. When acoustic signals are identical for all participating devices, the correct calculation of the ETOA is facilitated when each device has a one-to-one mapping between respective detected signals and respective ranging peers.

After receiving the schedule, each device starts recording with its microphone. It also calculates a proper delay (e.g., the time window length interval between signals multiplied by its order in the schedule starting from the instant when the initiating message is received) before it is to emit its acoustic signal. Because the delay is calculated by each device based on its own local clock, it is possible that the schedules calculated by different devices have slight skews. To accommodate this possibility, the interval between two consecutive acoustic signals (e.g., time window length 606) can be set sufficiently large so as to prevent, or at least significantly reduce the likelihood of, signal overlaps from different devices. In an example implementation, an interval of one second has been found to reliably separate acoustic signals of different devices.

After the last device has emitted its acoustic signal, each of the devices processes its recorded data and searches for received acoustic signals. An acoustic signal is related to a device 102 if the signal is detected within the time window 602 that is assigned 608 to that device 102 according to the pre-defined schedule. It is possible that the signal detection process fails. For example, the corresponding device may be too far away for an acoustic signal to reach but still within in the range of the wireless communication channel. The measured ETOAs between each device and each of the other devices, including detection failures, can be exchanged in the third step using a broadcast communication. After receiving the broadcasts from each of the other devices, an individual device can calculate its distance to the other devices or re-initiate a new ranging procedure if one or more failures have occurred.

In a real-world scenario, there may be multiple groups of devices that want to conduct ranging procedures simultaneously and may therefore contend for the acoustic channel. In an example embodiment, such contention may be resolved by preventing two nearby initiators from starting ranging procedures simultaneously. Each device listens to initiation messages from other devices. If a would-be initiator receives an initiation message from a nearby device, it is to defer the transmission of its own initiation message until the end of the other ranging procedure. In some relatively rare cases, it is still possible for two ranging procedures to happen concurrently if one initiator fails to reliably receive a broadcast initiation message of another. As a consequence, multiple acoustic signals may be found in a single time window 602 (of FIG. 6); a collision is thus detected. Because a given participating device cannot differentiate which acoustic signal is from a corresponding ranging peer versus from a contending nearby device, it should report a failure. The two initiators can then restart their respective ranging procedures at a later time, such as after a random back-off period.

4.5: Example Relative Left/Right Position Determination

Figure 8:
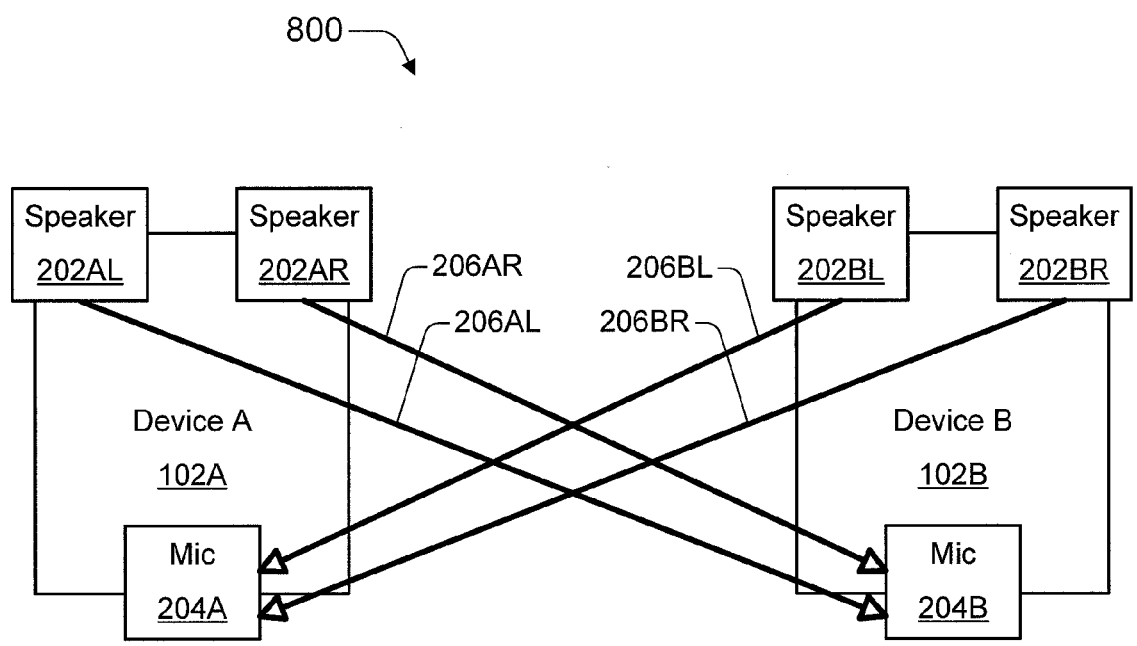
FIG. 8 is a block diagram of a ranging procedure being performed by two example devices using left/right speakers, microphones, and four acoustic signals.

FIG. 8 is a block diagram of a ranging procedure 800 being performed by two example devices 102 using left/right speakers 202L/R, microphones 204, and four acoustic signals 206. As illustrated, device A 102A includes a left speaker 202AL, a right speaker 202AR, and a microphone 204A. Device B 102B includes a left speaker 202BL, a right speaker 202BR, and a microphone 204B.

In an example embodiment, each device emits two acoustic signals 206L/R. Specifically, device A 102A causes its left speaker 202AL to emit acoustic signal 206AL and its right speaker 202AR to emit acoustic signal 206AR. Acoustic signals 206AL and 206AR are then received at microphone 204A of device A 102A and at microphone 204B at device B 102B. Similarly, device B 102B causes its left speaker 202BL to emit acoustic signal 206BL and its right speaker 202BR to emit acoustic signal 206BR. Acoustic signals 206BL and 206BR are then also received at microphone 204A of device A 102A and at microphone 204B at device B 102B. How a ranging procedure 800 may be performed to determine relative left/right positioning using these four acoustic signals 206AL/R and 206BL/R is described below.

For devices 102 with more than one speaker 202 and/or microphone 204, such devices 102 can obtain multiple different distances like D in the same manners as described herein above. Thus, they may determine each of the devices' relative positions. In FIG. 8, each device 102 includes two speakers 202L/R and one microphone 204. Based on the proximity detection scheme described herein above, the following left/right distances may be derived: $D_L=(d_{S-AL,M-B}+d_{S-BR,M-A})/2$ and $D_R=(d_{S-AR,M-B}+d_{S-BL,M-A})/2$. The relative left/right positions may be determined from a comparison of $D_L$ and $D_R$. If $D_L>D_R$, device A is on the left of device B, and vice versa.

Relative left/right positioning of two devices A and B can also be determined by using the received signal energy. For example, the left and right speakers of device A may each emit the same (e.g., chirp) acoustic signal. Both acoustic signals are received at and sensed by the microphone of device B. In this example, the left speaker emits the acoustic signal first. At device B, after detecting the positions of the two signals, the signal energy of each may be computed. If the energy of the first/left received signal is smaller than the energy of the second/right received signal, then we can determine that device A is positioned at the left side of device B. Similarly, if the energy of the first/left received signal is greater than the energy of the second/right received signal, then we can determine that device A is positioned at the right side of device B. This technique is generally effective because the energy of a sound signal decreases rapidly (e.g., proportional to the square of the distance) against the propagation distance; this technique is therefore likely to be especially useful in a close proximity situations. This signal-energy-based left/right positioning technique can also be applied to cases in which a device has two microphones.

5: Example Device implementations for Acoustic Ranging

Figure 9:
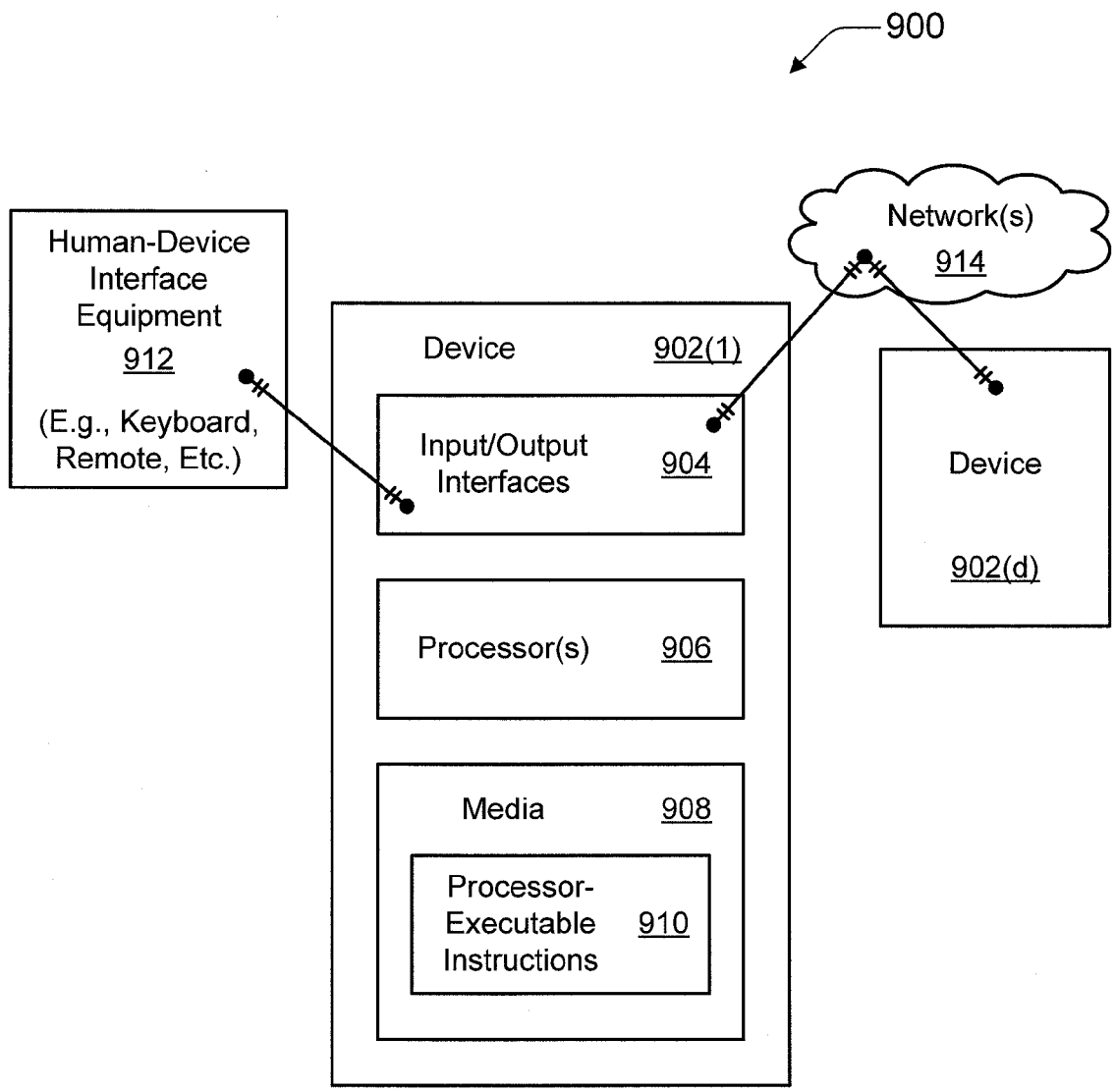
FIG. 9 is a block diagram of an example device that may be used to implement acoustic ranging.

FIG. 9 is a block diagram 900 of an example device 902 that may be used to implement acoustic ranging. As illustrated, two devices 902(1) and 902(d) are capable of engaging in communications via network(s) 914. Although two devices 902 are specifically shown, one or more than two devices 902 may be employed, depending on implementation. Network(s) 914 may be, by way of example but not limitation, an internet, an intranet, an Ethernet, a public network, a private network, a cable network, a digital subscriber line (DSL) network, a telephone network, a Fibre network, a Grid computer network, a wired network, an infrastructure or ad hoc wireless network, a cellular network, a mesh network, a peer-to-peer (P2P) network, an avenue to connect to any such network, some combination thereof, and so forth. However, network 914 is typically a wireless network.

Generally, a device 902 may represent any computer or processing-capable device, such as a server device; a workstation or other general computer device; a data storage repository apparatus; a personal digital assistant (PDA); a mobile phone; a gaming platform; an entertainment device; a router computing node; a mesh or other network node; a wireless access point; some combination thereof; and so forth. However, devices 902 are typically mobile devices of some type. As illustrated, device 902 includes one or more input/output (I/O) interfaces 904, at least one processor 906, and one or more media 908. Media 908 include processor-executable instructions 910.

In an example embodiment of device 902, I/O interfaces 904 may include (i) a network interface for communicating across network 914, (ii) a display device interface for displaying information on a display screen, (iii) one or more human-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, a screen, and so forth. Examples of (iii) human-device interfaces include those that communicate by wire or wirelessly to human-device interface equipment 912 (e.g., a keyboard, a remote, a mouse or other graphical pointing device, etc.) as well as a speaker, microphone, and so forth.

Generally, processor 906 is capable of executing, performing, and/or otherwise effectuating processor-executable instructions, such as processor-executable instructions 910. Media 908 is comprised of one or more processor-accessible media. In other words, media 908 may include processor-executable instructions 910 that are executable by processor 906 to effectuate the performance of functions by device 902. Processor-executable instructions may be embodied as software, firmware, hardware, fixed logic circuitry, some combination thereof, and so forth.

Thus, realizations for acoustic ranging may be described in the general context of processor-executable instructions. Generally, processor-executable instructions include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 906 may be implemented using any applicable processing-capable technology, and one may be realized as a general purpose processor (e.g., a central processing unit (CPU), a microprocessor, a controller, etc.), a graphics processing unit (GPU), a special-purpose processor, a derivative or combination thereof, and so forth. Media 908 may be any available media that is included as part of and/or accessible by device 902. It includes volatile and non-volatile media, removable and non-removable media, storage and transmission media (e.g., wireless or wired communication channels), hard-coded logic media, combinations thereof, and so forth. Media 908 is tangible media when it is embodied as a manufacture and/or as a composition of matter. For example, media 908 may include an array of disks or flash memory for longer-term mass storage of processor-executable instructions 910, random access memory (RAM) for shorter-term storing of instructions that are currently being executed and/or otherwise processed, link(s) on network 914 for transmitting communications, and so forth.

As specifically illustrated, media 908 comprises at least processor-executable instructions 910. Generally, processor-executable instructions 910, when executed by processor 906, enable device 902 to perform the various functions described herein. Such functions include, but are not limited to: (i) those acts that are illustrated in flow diagram 400 (of FIG. 4); (ii) those acts for implementing ranging procedures 200 and 800 (of FIGS. 2 and 8); (iii) those acts performed to realize the items on timeline 300 (of FIG. 3); (iv) those acts performed by the modules of software architecture 500 (of FIG. 5); (v) those features relating to schedule-based protocol 600 (of FIG. 6); (vi) those steps involving acoustic signal detection (of FIGS. 7A-7D); (vii) those functions represented by equations (7), (8), and/or (9); combinations thereof; and so forth.

The devices, acts, aspects, features, functions, procedures, nodes, modules, techniques, protocols, etc. of FIGS. 1-9 are illustrated in diagrams that are divided into multiple blocks and other elements. However, the order, interconnections, interrelationships, layout, etc. in which FIGS. 1-9 are described and/or shown are not intended to be construed as a limitation, and any number of the blocks and/or other elements can be modified, combined, rearranged, augmented, omitted, etc. in any manner to implement one or more systems, methods, devices, procedures, media, apparatuses, arrangements, etc. for acoustic ranging.

Although systems, media, devices, methods, procedures, apparatuses, mechanisms, schemes, approaches, processes, arrangements, and other example embodiments have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claimed invention.

What is claimed is:

1. A method for acoustic ranging on a first device, the method comprising:
   emitting a first acoustic signal from the first device;
   receiving the first acoustic signal at a first time at the first device;
   receiving a second acoustic signal at a second time at the first device, the second acoustic signal emitted by a second device;
   ascertaining a first value reflecting a time difference between the first time and the second time;
   receiving from the second device at least a second value reflecting a time difference between when the second device received the first acoustic signal and the second acoustic signal; and
   determining a distance between the first device and the second device based at least on the first value and the second value, the first device being different from the second device.

2. The method as recited in claim 1, wherein:
   the act of emitting a first acoustic signal comprises an act of emitting the first acoustic signal using a speaker of the first device;
   the act of receiving the first acoustic signal at a first time comprises an act of receiving the first acoustic signal at the first time using a microphone of the first device; and
   the act of receiving a second acoustic signal at a second time comprises an act of receiving the second acoustic signal at the second time using the microphone of the first device.

3. The method as recited in claim 1, wherein the act of determining a distance between the first device and the second device based at least on the first value and the second value comprises an act of determining the distance between the first device and the second device based at least on the first value, the second value, a first dimension reflecting a distance between a speaker of the first device and a microphone of the first device, and a second dimension reflecting a distance between a speaker of the second device and a microphone of the second device.

4. The method as recited in claim 1, wherein the act of ascertaining a first value comprises an act of ascertaining a first sample point of the first acoustic signal, ascertaining a first sample point of the second acoustic signal, and counting samples between the first sample points of the first and second acoustic signals to derive the first value, wherein the samples are generated on a fixed frequency by an analog-to-digital (A/D) converter of the first device.

5. The method as recited in claim 4, wherein the act of ascertaining a first value further comprises an act of ascertaining the first value based at least in part on a sampling frequency for the sample points of the analog-to-digital (A/D) converter.

6. The method as recited in claim 1, further comprising:
   calculating the first time at which the first acoustic signal is received using a coarse-to-fine grained approach that starts by using window energy to locate a possible time of arrival (TOA) and progresses to using at least one cross-correlation computation to obtain a finer TOA from the possible TOA.

7. The method as recited in claim 6, wherein the act of calculating comprises acts of:
   locating a maximal window energy in an acoustic recording to a satisfactory precision by reducing a size of windows within which energy of the acoustic recording is being determined; and
   locating a high cross-correlation result of the at least one cross-correlation computation while reducing a size of windows within which the cross-correlation computation is being performed.

8. The method as recited in claim 1, wherein:
   the first value comprises a first elapsed time between two time-of-arrivals (ETOA) of the first and second acoustic signals, and the second value comprises a second ETOA of the first and second acoustic signals; and the act of determining a distance between the first device and the second device responsive to at least the first value and the second value comprises an act of determining a difference between the first ETOA and the second ETOA; or
   the first value comprises a first difference between two index sample points at the first device, and the second value comprises a second difference between two index sample points at the second device.

9. The method as recited in claim 1, further comprising:
   determining a relative left/right positioning between the first device and the second device using (i) two speakers and one microphone included in the first device or the second device and (ii) separate computations for a left distance and a right distance.

10. The method as recited in claim 1, further comprising:
    determining a relative left/right positioning between the first device and the second device using (i) two speakers and one microphone included in the first device or the second device and (ii) separate computations for a left received signal energy magnitude and a right received signal energy magnitude, and a computation of a difference between the left received signal energy magnitude and the right received signal energy magnitude.

11. The method as recited in claim 1, further comprising:
    receiving multiple respective acoustic signals at multiple respective times, the multiple respective acoustic signals emitted by multiple respective devices;
    receiving from the multiple respective device at least multiple respective values reflecting respective time differences between when the multiple respective devices received the first acoustic signal and respective ones of the multiple respective acoustic signals; and
    determining respective distances between the first device and each of the multiple respective devices responsive to at least the first value and respective ones of the multiple respective values.

12. The method as recited in claim 11, wherein the act of receiving multiple respective acoustic signals at multiple respective times comprises an act of receiving the multiple respective acoustic signals within multiple respective time windows that are sequentially assigned to the multiple respective devices.

13. The method as recited in claim 1, further comprising:
    transmitting to multiple other devices an acoustic ranging procedure initiation message that includes an acoustic signal order and a time window length; the acoustic signal order assigning respective time windows for acoustic signal emission to respective ones of the multiple other devices, and the time window length indicating a length of each of the respective time windows.

14. The method as recited in claim 1, further comprising:
transmitting to multiple other devices an acoustic ranging procedure initiation message that includes an assignment of a respective code to each respective one of the multiple other devices;
receiving multiple other acoustic signals that are coded in accordance with the assigned respective code for each respective one of the multiple other devices; and
identifying individual ones of the multiple other acoustic signals using the assigned respective code for each respective one of the multiple other devices.

15. The method as recited in claim 1, further comprising at least one of:
transmitting an acoustic ranging procedure initiation message to the second device, the acoustic ranging procedure initiation message including one or more parameters specifying how to participate in an acoustic ranging procedure; or
receiving an acoustic ranging procedure initiation message from the second device.

16. One or more processor-accessible storage media comprising processor-executable instructions that, when executed, direct a first device to perform acts comprising:
emitting a first acoustic signal from the first device;
receiving the first acoustic signal at a first time at the first device;
receiving a second acoustic signal at a second time at the first device, the second acoustic signal emitted by a second device;
ascertaining a first value reflecting a time difference between the first time and the second time by ascertaining a first sample point of the first acoustic signal, ascertaining a first sample point of the second acoustic signal, and counting samples between the first sample points of the first and second acoustic signals to derive the first value, wherein the samples are generated on a fixed frequency by an analog-to-digital (A/D) converter of the first device;
receiving from the second device at least a second value reflecting a time difference between when the second device received the first acoustic signal and the second acoustic signal; and
determining a distance between the first device and the second device based at least on the first value and the second value, the first device being different from the second device.

17. A first device comprising:
at least one speaker;
at least one microphone;
an actuator to emit, in conjunction with the speaker, a first acoustic signal;
a sensor to receive, in conjunction with the microphone, the first acoustic signal at a first time and a second acoustic signal at a second time, the second acoustic signal emitted by a second device;
a calculator to ascertain a first value reflecting a time difference between the first time and the second time and to determine a distance between the first device and the second device based at least on the first value, the first device being different from the second device;
an application programming interface (API) to expose an acoustic ranging capability to other applications; and
an acoustic ranging controller to control performance of acoustic ranging procedures by controlling at least the calculator and to interact with the other applications via the API by receiving acoustic ranging procedure requests from the other applications and by sending calculated distances to the other applications.

18. The device as recited in claim 17, further comprising:
a communicator to receive, via a communication channel from the second device, at least a second value reflecting a difference between when the second device received the first acoustic signal and the second acoustic signal;
wherein the calculator is further to determine the distance between the first device and the second device based at least on the first value and the second value.

19. The device as recited in claim 17, further comprising:
a signal generator to generate a waveform for the first acoustic signal and to feed the generated waveform to the actuator; and
a detector to detect the first time and the second time;
wherein the sensor is to record incoming sound data into a buffer and feed the recorded sound data to the detector; and
wherein the detector is further to detect a first sample point corresponding to the first time and a second sample point corresponding to the second time by analyzing the recorded sound data and a reference version of the generated waveform, the first sample point and the second sample point relating to sample points of an analog-to-digital (A/D) converter of the first device.

20. The device as recited in claim 17, wherein the sensor is to sense the first and second acoustic signals via a coarse-to-fine grained approach that starts by using window energy to locate a possible time of arrival (TOA) and progresses to using at least one cross-correlation computation to obtain a finer TOA from the possible TOA.

* * * * *